United States Patent
Latschbacher et al.

(10) Patent No.: US 6,772,546 B2
(45) Date of Patent: Aug. 10, 2004

(54) MARKING ELEMENT FOR MARKING TIMBER, ESPECIALLY TREE TRUNKS

(75) Inventors: Klaus Latschbacher, Kronstorf (AT); Johann Huber, Kronstorf (AT); Gerhard Ploier, Traun (AT)

(73) Assignee: Latschbacher GmbH, Kronstorf (AT)

( * ) Notice: Subject to any disclaimer, the term of this patent is extended or adjusted under 35 U.S.C. 154(b) by 0 days.

(21) Appl. No.: 10/108,300

(22) Filed: Mar. 28, 2002

(65) Prior Publication Data

US 2002/0170213 A1 Nov. 21, 2002

(30) Foreign Application Priority Data

Mar. 28, 2001 (EP) ............................................ 01107646

(51) Int. Cl.⁷ ................................................ G09F 3/12
(52) U.S. Cl. ..................... 40/299.01; 40/668; 340/572.8
(58) Field of Search ............................. 40/299.01, 625, 40/668, 300, 301; 340/572.1, 572.8

(56) References Cited

U.S. PATENT DOCUMENTS

| | | | | |
|---|---|---|---|---|
| 4,475,481 A | * | 10/1984 | Carroll | 119/51.02 |
| 4,718,697 A | * | 1/1988 | Berardus van Amelsfort | 283/107 |
| 4,908,503 A | * | 3/1990 | Bernard | 235/489 |
| 5,006,830 A | * | 4/1991 | Merritt | 340/573.1 |
| 5,553,426 A | * | 9/1996 | Ostergaard | 52/103 |
| 5,631,631 A | * | 5/1997 | Deschenes | 340/572.1 |
| 5,654,693 A | * | 8/1997 | Cocita | 340/572.1 |
| 5,859,587 A | * | 1/1999 | Alicot et al. | 340/572.8 |
| 5,973,599 A | * | 10/1999 | Nicholson et al. | 340/572.8 |
| 6,144,301 A | * | 11/2000 | Frieden | 340/572.8 |
| 6,239,737 B1 | * | 5/2001 | Black | 342/51 |

FOREIGN PATENT DOCUMENTS

| | | | |
|---|---|---|---|
| DE | 198 07 284 A1 | 9/1999 | |
| EP | 0 248 928 A1 | 12/1987 | |
| EP | 535919 A2 | * 4/1993 | 40/668 |
| GB | 2075464 | * 11/1981 | 40/668 |
| GB | 2 265 136 A | 9/1993 | |

* cited by examiner

Primary Examiner—Brian K. Green
(74) Attorney, Agent, or Firm—Browdy and Neimark, P.L.L.C.

(57) ABSTRACT

A marking element is proposed for marking timber, especially tree trunks, having a tag-like marking element (9) with at least one fastening element (11, 12) disposed on it for fastening the marking element (10) to the timber to be marked. To provide the marking, the marking element furthermore has a transponder (14) incorporating a data storage for the wireless transmission of data. This permits the wireless storing and reading of a multitude of data without requiring visual contact.

6 Claims, 4 Drawing Sheets

MARKING ELEMENT FOR MARKING TIMBER, ESPECIALLY TREE TRUNKS

BACKGROUND OF THE INVENTION

1. Technical Field of the Invention

The present invention is concerned with a marking element for marking timber, especially tree trunks, with a tag-like marking element bearing a marking, having at least one fastening element for fastening the marking element on the timber to be marked.

2. Prior Art

A marking element or marking tag of this type, which is known, for example, from GB 2075464 A, carries a marking in the form of a number or other optical code, in order to mark, for example, tree trunks in the forest. The code number is then assigned, for example in a portable computer, to the corresponding timber data of the given tree trunk.

A shortcoming of the known marking is that it requires a perfect line of sight to read the code number, and tables or a computer must be available to be able to derive the corresponding timber data from the number. Due to weather and location conditions, being able to read the number is often difficult. When a larger number of tree trunks are being recorded, each individual code number must be read and entered into the computer in a tedious and labor-intensive manner to obtain an overview of the entire stock, for example when a delivery is received. Manipulations in the assignment of the data are easily possible.

OBJECT AND SUMMARY OF THE INVENTION

It is an object of the present invention to create a marking element of the above type whereby a recording of timber data becomes easier, faster and automatable.

This object is met according to the invention in such a way that, to provide the marking, a transponder having a data storage for a wireless transmission of data is provided on the marking member.

The advantages of the inventive marking element lie in the fact, particularly, that a multitude of timber data and other data can be entered wirelessly into the marking element and, accordingly, read out wirelessly as well. Visual contact to the marking element is not required during the reading or writing. A plurality of marking elements, i.e., for example a plurality of tree trunks, can be wirelessly recorded at the same time. This permits, in a simple manner, the automatic and wireless recording of the data of all tree trunks carried by a truck entering a timber processing plant. Not only can a multitude of data be stored, but they can also be changed or supplemented if required, for example, with the service company and forest enterprise data, the transportation company, the logger and log mover. Dust, dirt, moisture and temperatures have no impact on the storage and read-out of the stored data. Lastly, it is also advantageous that all marking elements can initially be produced identical, i.e., for example without pre-impressed or pre-printed consecutive numbers, as the data entry takes place only on site, i.e., for example in the forest. By storing the data in the marking element, i.e., on the given tree trunk itself, a read-out of the data can take place with any random wireless reading device, which does not need to be provided with any associated information.

The measures listed in the subclaims permit advantageous further developments and improvements of the marking element specified in claim 1.

The transponder advantageously has a transmit/receive antenna for radio-frequency electromagnetic waves in order to attain the best possible coverage for the data transmission. In a favorable flat design the antenna encompasses an electronic chip that is provided with the data storage and permits input and read-outs of data in a manner known per se via radio-frequency electromagnetic waves.

The preferably tag-shaped transponder is disposed recessed in the marking member for better mechanical protection. This is enhanced by a cover plate and/or cover film that covers the transponder, especially in a waterproof manner. This also ensures that the transponder will not be damaged when it is driven into a piece of wood, e.g., a log, and still has the required seal against water and other effects of the environment after having been driven in.

The cover plate or film, in the simplest case, is glued to the marking member, especially by means of a self-adhesive contact layer or a self-adhesive film frame encompassing the transponder. Alternately, the cover plate, which is preferably recessed in the marking member may also be welded to the marking element along its edges, preferably by means of ultrasonic welding, laser welding or hot pressing. The latter methods ensure a greater sturdiness and better protection against mechanical damage, especially while the marking element is being driven into the wood.

To facilitate the welding process and attain a better weld joint, the cover plate and/or marking element has a welding strip that encompasses the transponder to weld them to one another.

In addition to the electronic marking by the transponder, the cover plate or cover film may additionally also be provided with an optical marking, which is known per se, to obtain some information also without a wireless reading device.

The marking element is preferably composed of plastic and has, as fastening elements, integral drive-in projections, as it they are known per se.

BRIEF DESCRIPTION OF THE DRAWINGS

Example embodiments of the invention are shown in the drawing and will be explained in more detail below. In the drawings.

DETAILED DESCRIPTION OF THE PREFERRED EMBODIMENT(S) OF THE INVENTION

Figure 1:
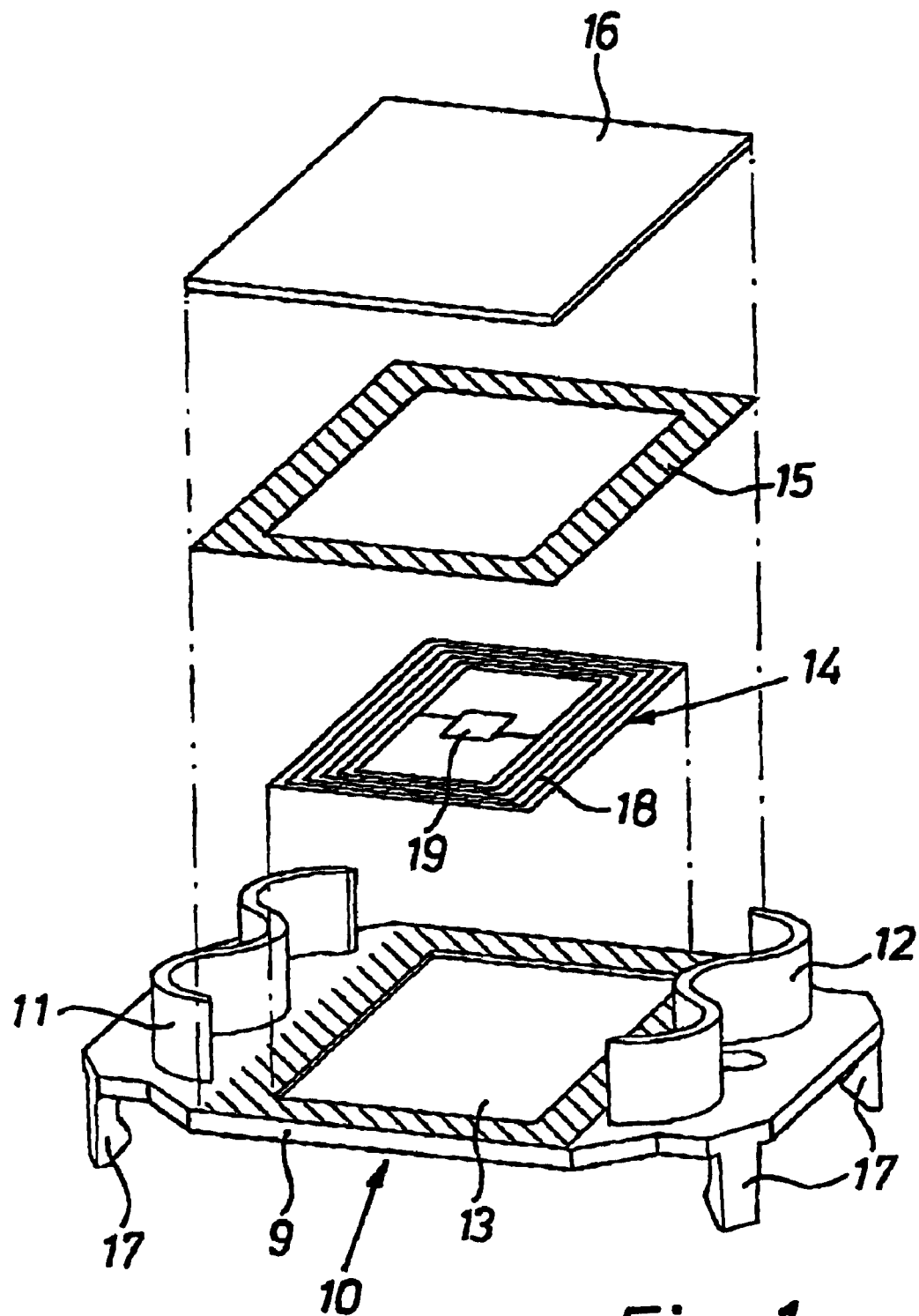
FIG. 1 shows, in an exploded view, a marking tag with a cover plate and film frame for a transponder, as a first embodiment of the invention.

The marking element shown in FIG. 1 as a first embodiment, which is designed as a marking tag 10, has a similar design as the marking tag described in the above mentioned prior art. A tag-shaped marking member 9 has on its reverse two integral, corrugated-fastener-type drive-in projections, 11, 12 as fastening elements, which are disposed on both sides of a central, rectangular recess 13. This recess 13 serves to receive a transponder 14 that is designed as a flat film or flat tag, and the shape of which corresponds to that of the recess 13. A double-sided self-adhesive film frame 15 has a central through-opening, the shape of which corresponds to that of the recess 13 or transponder 14, respectively. A square or rectangular cover plate 16 corresponds in its outer contour to that of the film frame 15.

To secure the transponder 14, it is inserted into the recess 13 of the marking member 9, then the film frame 15 is placed around the recess 13 onto the marking element 9, and lastly the cover plate 16 is pressed onto the film frame 15 so that the cover plate 16 sealingly closes the recess 13 and thus the transponder 14. A glue or adhesive may be used alternately or in addition to the self-adhesive design if needed.

The front of the marking tag 10, which is facing down in FIG. 1, has integral hook-like holding projections 17 on its four corners. They serve to put the marking tag 10 on a drive-in hammer, which is not shown, with the aid of which the marking tag 10 is driven in, for example, against the end face of a log. The corrugated-fastener-type drive-in projections 11, 12, penetrate into this end face and thus secure the marking tag 10 to the log. This is described in more detail in the prior art indicated above or in P 3837175. The marking tag 10 is made in its entirety of a plastics material, e.g., of a plastics material that dissolves during paper production in the baths used in the process. Alternate designs of metal are also conceivable in principle.

The transponder 14 incorporates a transmit and receive antenna 18 that has multiple rectangular windings and is connected to a centrally disposed electronic chip 19. The data that are transmitted by means of radio-frequency electromagnetic waves of a transmit and receive unit, which is not shown here, are detected by the transmit and receive antenna 18 and stored in a storage device of the electronic chip 19. This electronic chip 19 does not require its own power supply and uses, in a manner known per se, a portion of the energy of the electromagnetic waves to perform the necessary electronic operations. The stored data can be read out wirelessly in a similar manner by electromagnetic activation of the transmitter portion of the electronic chip 19.

In the practical application, with a marking tag 10 that is already secured to a log, the required or desired data for this log or round timber are entered by an operator equipped with a portable transmit and receive unit. The data may be, for example, the log serial number, a log sub-number, the wood type, the length, the diameter, the quality class, and the like. The name of the forest enterprise, the name of the logger and the name of the log mover may additionally be entered as well, and later also the name of the transportation firm. This makes it possible to wirelessly identify the log again later at any time, be it during storage, inventory, marking of sawed timber packages, loading of trucks (loading list) and the like. A loading list of this type, for example, is then created automatically by reading the transponders while the truck or the like is being loaded. The data of the individual logs can then, for example, also be wirelessly transmitted to an active transponder on truck and recorded by the same, so that, for example, when the truck enters onto the site of a processing plant, the loading list is immediately wirelessly transmitted, for example at the factory gate. The announced list can then be compared electronically to the actual list. Added and removed logs can easily be recorded automatically for stock keeping. When the timber is cut in a lumber-mill, the cut timber can be accounted for automatically and a yield calculation (also per log) and stock deduction can be performed automatically. In the forest itself, inventory can easily be taken for the forester or round timber can easily be transferred to a buyer.

Figure 2:
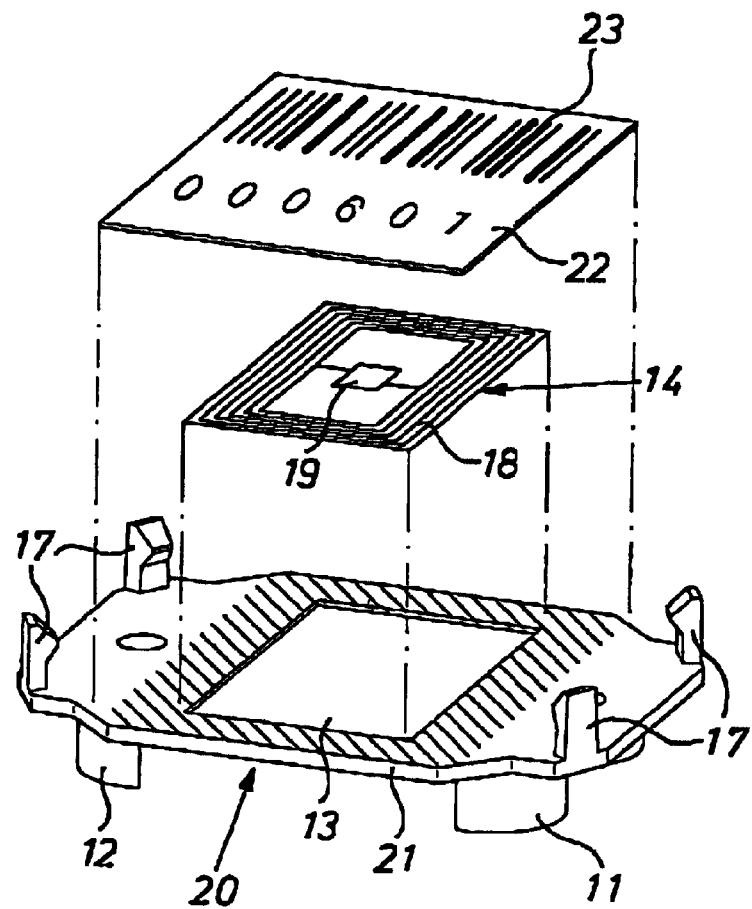
FIG. 2 shows, in an exploded view, a marking tag having a transponder that is recessed on the opposite side of the marking element and a coded cover plate, as a second embodiment of the invention.

The second embodiment shown in FIG. 2 largely corresponds to the first embodiment, so that components or areas that are identical or have identical effects were given the same reference numerals and will not be described again. In this marking tag 20 the recess 13 is provided on the front of the marking member 21. The weather-resistant and waterproof cover of the transponder 14 that is inserted into the recess 13 is effected in this case by means of a cover film 22 that extends over the transponder 14. It is glued to the marking member 21 as a one-sided self-adhesive film. The rectangular cover film 22 is provided with a bar coding 23. This is optional and may also be eliminated or substituted with another coding, such as a number. This provides the option to be able to read data also in another manner, in addition to the data stored electronically.

In the first and second embodiment the transponders 14 may also be affixed on the opposite side of the marking element. In lieu of the cover film 22, a cover plate may be directly glued to the marking member 9 or 21.

Figure 3:
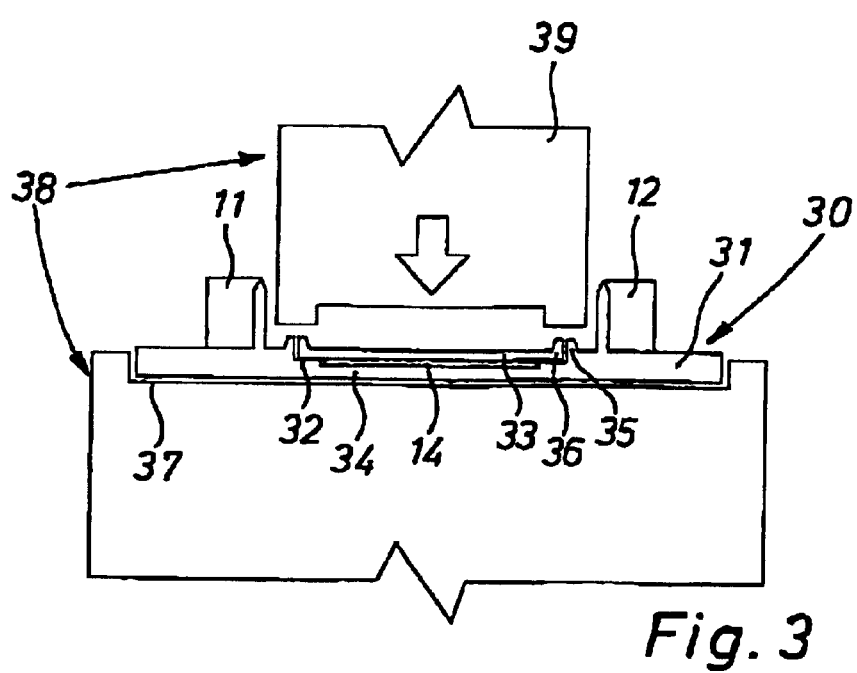
FIG. 3 shows, in a sectional view, a marking tag, which also has a recessed cover, inserted into a fusion welding device, as a third embodiment.
Figure 4:
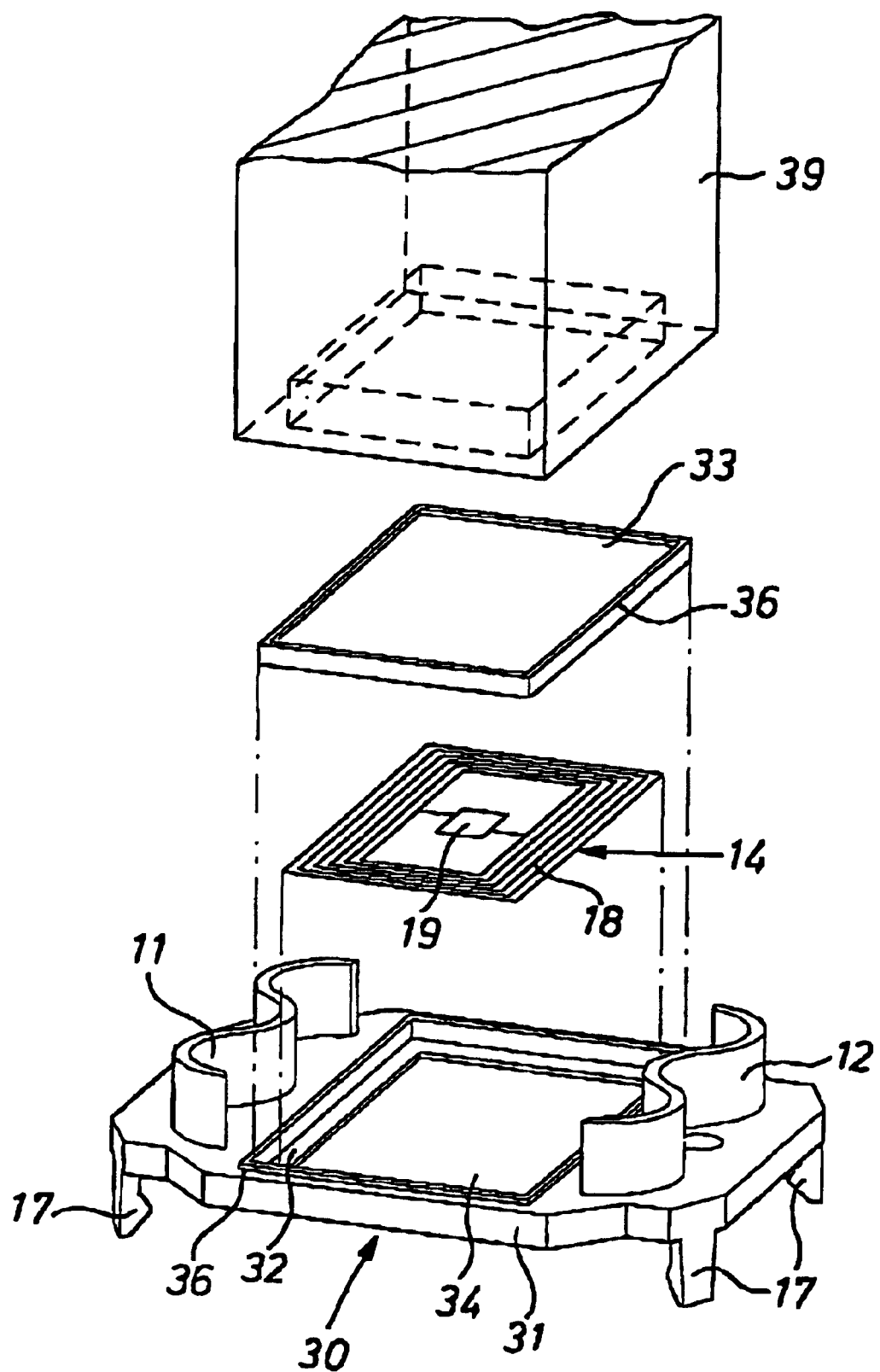
FIG. 4 shows the marking tag shown in FIG. 3 in an exploded view.

In the third embodiment shown in FIGS. 3 and 4, the marking member 31 of a marking tag 30 has on its reverse a first recess 32 to receive a cover plate 33, as well as a second recess 34 in the first recess 32 to receive the transponder 14. An integral welding strip 35 on the marking member 31 extends along the edge of the first recess 32. A corresponding welding strip 36 is provided integrally on the circumference edge of the cover plate 33. After inserting the transponder 14 and cover plate 33, the welding strips 35, 36 thus extend parallel and immediately adjacent to one another, as can be seen particularly in FIG. 3.

In the third embodiment, the cover plate 33 is connected to the marking member 31 by means of hot pressing. For this purpose the appropriately prepared marking tag 30 is inserted into an matching recess 37 of a fusion welding unit 38. An appropriately heated welding bar 39 that is moved in from above connects the two welding strips 35, 36 in a weather-resistant manner by hot pressing. In this embodiment, too, the transponder can, in principle, also be inserted accordingly on the front of the marking tag 30.

Figure 5:
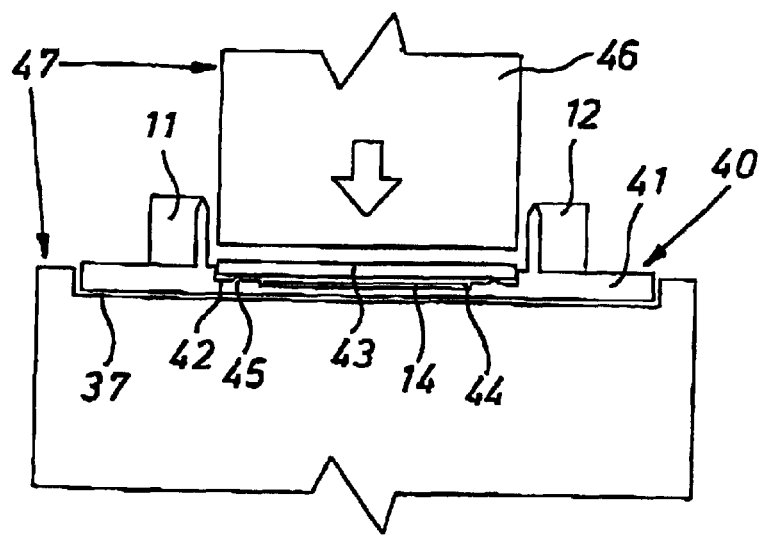
FIG. 5 shows, in a sectional view, a marking tag having a recessed cover plate inserted into an ultrasound welding device, as a fourth embodiment of the invention.
Figure 6:
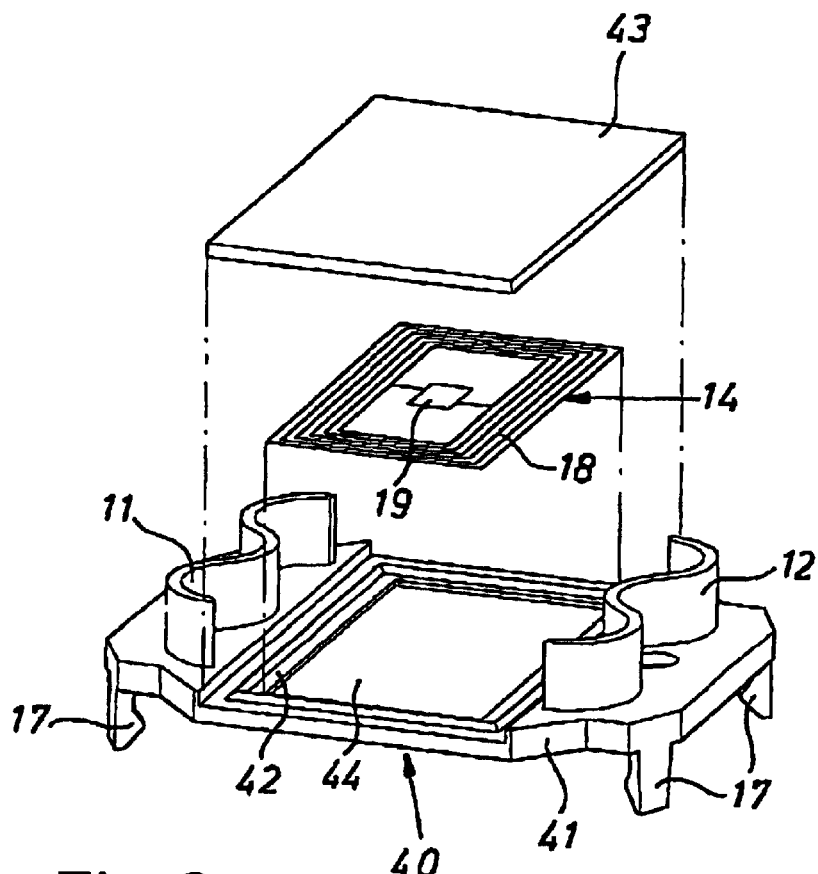
FIG. 6 shows the marking element shown in FIG. 5 in an exploded view.

In the fourth embodiment shown in FIGS. 5 and 6, the marking member 41 of a marking tag 40 also has a first recess 42 to receive a cover plate 43, as well as a second recess 44 within the first recess 42 to receive the transponder 14. The cover plate 43 does not have a welding strip, however, a welding strip 45 rises from the floor area of the first recess 42 and encompasses the second recess 44. After insertion of the transponder 14, the cover plate 43 is inserted into the first recess 42 in this embodiment as well and thus comes into contact with the welding strip 45. A welding bar 46 of an ultrasonic welding unit 47 is moved to the cover plate 43 as shown in FIG. 5 and welds the welding strip 45 to the cover plate 43 ultrasonically.

A further possible connecting method that is not shown is the laser welding, which is suitable for connecting a cover plate to the marking member. The above welding methods can, of course, also be used for designs according to the first two embodiments.

In the third and fourth embodiment, it is possible as well, in principle, to provide the transponder 14 on either side of the given marking member.

Bar codes or other types of coding can be affixed to the cover plates in each case if the same are disposed on the front of the given marking element.

What is claimed is:

1. A marking element for marking timber, comprising:
   a marking member having fastening elements for fastening the marking element on the timber to be marked, wherein the marking member has, for marking purposes, a transponder which has a data storage for wireless data transmission incorporated therein,
   wherein, the transponder is formed in a tag or a film shape and is disposed in a recess in the marking member,
   wherein a cover plate is provided that engages the marking member and covers the transponder, so as to preclude entry of water into the recess,
   wherein the marking element is composed of plastic and the fastening elements are integral drive-in projections formed on opposite sides of the recess, and
   wherein the cover plate that is recessed in the marking member and is welded along an edge thereof to the marking member, by means of ultrasonic welding, laser welding or hot pressing.

2. The marking element as set forth in claim 1, wherein the transponder has a transmit/receive antenna for radio-frequency electromagnetic waves.

3. The marking element as set forth in claim 2, wherein the transmit/receive antenna encompasses an electronic chip equipped with the data storage.

4. The marking element as set forth in claim 1, wherein the cover plate and/or the marking member has, to weld them to one another, a welding strip along an edge thereof.

5. The marking element as set forth in claim 1, wherein the cover plate is provided with an optical marking.

6. The marking element as set forth in claim 1, wherein the data storage is provided to receive and transmit timber data and cutting and processing data.

* * * * *